(12) United States Patent
Lau et al.

(10) Patent No.: US 8,908,530 B2
(45) Date of Patent: Dec. 9, 2014

(54) DEMAND-DRIVEN PRIORITIZED DATA STRUCTURE

(75) Inventors: Richard Lau, Morganville, NJ (US); Heechang Kim, Marlboro, NJ (US); Bruce Siegell, Shrewsbury, NJ (US)

(73) Assignee: TTI Inventions C LLC, Wilmington, DE (US)

( * ) Notice: Subject to any disclaimer, the term of this patent is extended or adjusted under 35 U.S.C. 154(b) by 283 days.

(21) Appl. No.: 12/855,359

(22) Filed: Aug. 12, 2010

(65) Prior Publication Data

US 2010/0302970 A1 Dec. 2, 2010

Related U.S. Application Data

(63) Continuation of application No. 11/986,845, filed on Nov. 27, 2007, now Pat. No. 7,801,073.

(60) Provisional application No. 60/861,161, filed on Nov. 27, 2006.

(51) Int. Cl.
*G01R 31/08* (2006.01)
*H04L 12/801* (2013.01)
*H04L 12/851* (2013.01)
*H04W 84/18* (2009.01)
*H04W 40/20* (2009.01)
*H04W 40/24* (2009.01)

(52) U.S. Cl.
CPC .............. *H04L 47/10* (2013.01); *H04W 84/18* (2013.01); *H04L 47/14* (2013.01); *H04W 40/20* (2013.01); *H04L 47/2433* (2013.01); *H04W 40/248* (2013.01)
USPC ......................................................... 370/238

(58) Field of Classification Search
CPC ..... H04L 47/2433; H04L 47/10; H04L 47/14; H04W 40/248; H04W 84/18; H04W 40/20

USPC ............ 370/238; 709/238; 333/187, 199, 189
See application file for complete search history.

(56) References Cited

U.S. PATENT DOCUMENTS

| 6,389,423 | B1 | 5/2002 | Sakakura |
| 6,917,985 | B2 | 7/2005 | Madruga et al. |

(Continued)

FOREIGN PATENT DOCUMENTS

| JP | 2000-299698 | 10/2000 |
| JP | 2003-273788 | 9/2003 |

(Continued)

OTHER PUBLICATIONS

Office Action from related Japanese Patent Application No. 2009-538418; Jul. 26, 2011; 2 pages.

(Continued)

*Primary Examiner* — Chandrahas Patel
(74) *Attorney, Agent, or Firm* — Fitch, Even, Tabin & Flannery LLP (57) ABSTRACT

A system and method for optimizing the efficiency of data sharing among a set of radio nodes in a radio environment is provided. The technique includes identifying a data unit and assigning it a class, identifying a connectivity type, computing a significance factor based on connectivity type and assigned class, mapping the significance factor to a priority factor, and scheduling output of the data unit based on the priority factor. A scheduler algorithm can be used for scheduling output. The class can be assigned based on which nodes of the set of radio nodes possess copies of the data unit at a given time. An arbitration process can be used to determine the priority factor. A significance factor weighting algorithm, based on how many nodes will be receiving the data and on how much a node needs the data, can be used to determine the significance factor.

20 Claims, 6 Drawing Sheets

(56) References Cited

U.S. PATENT DOCUMENTS

| | | | |
|---|---|---|---|
| 7,385,999 B1* | 6/2008 | Young et al. ............... 370/432 |
| 7,460,474 B2 | 12/2008 | Ishii et al. |
| 7,643,790 B2 | 1/2010 | Jang et al. |
| 7,835,351 B2* | 11/2010 | Mosko et al. ............... 370/389 |
| 2003/0174652 A1 | 9/2003 | Ebata |
| 2004/0028018 A1 | 2/2004 | Cain |
| 2004/0174865 A1 | 9/2004 | O'Neill |
| 2005/0174972 A1 | 8/2005 | Boynton |
| 2006/0109829 A1 | 5/2006 | O'Neill |
| 2008/0212545 A1 | 9/2008 | Lau et al. |

FOREIGN PATENT DOCUMENTS

| | | |
|---|---|---|
| JP | 2004-253989 | 9/2004 |
| JP | 2004-364308 | 12/2004 |
| JP | 2005-130053 | 5/2005 |
| JP | 2005-176046 | 6/2005 |
| JP | 2006-174263 | 6/2006 |
| KR | 10-2005-0106527 A1 | 11/2005 |
| WO | 2005-048542 A1 | 5/2005 |

OTHER PUBLICATIONS

Copenheaver, Blaine; Search Report and Written Opinion of the International Searching Authority; dated Mar. 21, 2008; 4 pages.
Atoche et al.; "Weighted Hop Priority Control Scheme for Multihop Wireless Ad Hoc Networks"; in IEEE Asia-Pacific Conference on Communications, Oct. 3-5, 2005; pp. 48-52.
Wang, et al., "End-toEnd Throughput and Delay Assurances in Multihop Wireless Hotspots". proceedings of the 1st ACM International Workshop: ACM. San Diego, CA, Published 2003, pp. 93-102.
Niculescu, et al., Ad Hoc Positioning System (APS) in: IEEE Global Telecommunications Conference, Globecom '01, Nov. 25-29, 2001, San Antonio, TX vol. 5, p. 2926-2931.
R. Lau, S. Demers., Y. Ling, B. Siegell, E. Vollset, K. Birman, R. vanRenesse, H. Shrobe, J. Bachrach, L. Foster, "Cognitive Adaptive Radio Teams" Proceeding of the 2nd International Workshop on Wireless Ad-Hoc and Sensor Networks, Jun. 2006.
A. Demers, D. Greene, C. Hauser, W. Irish, J. Larson, S. Shenker, H. Stuirgis, D. Swinehart, D. Terry, "Epidemic Algorithms for Replicated Database Maintenance" Proceedings of the Sixth Annual ACM Symposium on Principles of Distributed Computing, 1987, 1-12.
R. Chandra, V. Ramasubramanian, K. Birman, "Anonymous Gossip: Improving Multicast Reliability in Mobile Ad-Hoc Networks", IEEE Computer Society, Proceedings of the 21st International Conference on Distributed Computing Systems, 2001, pp. 275-283.
Korean Office Action from related Korean Patent Application No. 2009-7013322; dated Mar. 16, 2012; 3 pages.
Chun, Byung-Gon et al.; "Evaluation of Packet Scheduling Algorithms in Mobile Ad Hoc Networks," Mobile Computing and Communications Review, vol. 6, No. 3; Jul. 1, 2002; pp. 36-49.
Lau, Richard et al.; "Demand-Driven Prioritization for ACERT;" Second International Conference on Systems (ICONS '07); Apr. 1, 2007; 6 pages.
Extended European Search Report from related European Patent Application No. 07862232.1 dated Jun. 24, 2013; 4 pages.

* cited by examiner

DEMAND-DRIVEN PRIORITIZED DATA STRUCTURE

CROSS REFERENCE TO RELATED APPLICATIONS

This application is a continuation of co-pending U.S. application Ser. No. 11/986,845, filed Nov. 27, 2007, which claims the benefit of U.S. Provisional Application No. 60/861,161, filed Nov. 27, 2006, which are both hereby incorporated by reference herein in their entirety for all purposes.

GOVERNMENT LICENSE RIGHTS

This invention was made with Government support under contract NBCHC050161 awarded by the Defense Advanced Research Projects Agency (DARPA). The Government has certain rights in this invention.

FIELD

The present invention relates generally to ad-hoc networking, and more specifically to disseminating data among nodes in a radio environment.

BACKGROUND

In a harsh radio environment, where deep fading and noisy conditions are commonplace, the availability of a link between any two nodes is uncertain. One can expect that loss of connectivity may last for an extended period of time. Yet, a team of ad-hoc mobile nodes moving around the harsh environment need to send data to all the other radio nodes in the environment. Due to the uncertainty of the availability of links, a large percent of the sent data do not arrive at all the other nodes when first transmitted. Accordingly, these data must subsequently be sent again.

Existing methods, such as epidemic algorithms and gossip algorithms, are traditionally used to retransmit data that had not initially been received at all of the nodes. In these approaches, each node randomly picks a neighbor, finds out what data is missing from that neighbor and transmits the missing data. However, retransmissions using these methods are inefficient because, among other things, redundant data is transmitted. In "Epidemic Algorithms for Replicated Database Management" in ACM Symposium on Principles of Distributed Computing, 1987, Demers et al. describe antientropy and rumor mongering as examples of epidemic processes. In anti-entropy, each site regularly chooses another site at random and exchanges information with it. This is a reliable technique for propagating data, but is quite cumbersome, because the exchanges can involve redundant or repetitious data transmission. In rumor mongering, a site receives an update, or "hot rumor" which it tries to share with other sites by asking one of those other sites whether it has the hot rumor. If the hot rumor is shared with one site, another site can be asked. Rumor mongering again can involve redundant transmission of data, and also is not as reliable as anti-entropy because there is a chance that an update will not reach all sites.

R. Chandra, et al., in "Anonymous Gossip: Improving Multicast Reliability in Mobile Ad-Hoc Networks," International Conference on Distributed Computing Systems, 2001, describe implementing periodic anonymous gossip in the background to ensure that most of the reachable members of a network receive packets which have been multicast to the group. In a round of gossip, an originator node randomly selects another node in its group and sends the selected node information about the originator's messages. If the selected node does not already have the originator's messages, the two nodes can exchange messages. However, transmission of duplicate or redundant data can occur. Among the problems of the aforementioned approaches is the use of a point-to-point or node-to-node solution as well as the lack of information regarding what the rest of the nodes are doing. As a result, these approaches are not optimized for the radio environment, which is inherently a broadcast medium, transmitting to multiple nodes simultaneously.

BRIEF SUMMARY

In a harsh wireless environment in which ad-hoc wireless nodes are configured in a mesh network, a common application is to have each node broadcast or multicast data to other nodes. Because wireless ad-hoc networks are inherently unreliable, transmitted data very often do not reach intended destination and therefore retransmission of this data, very often multiple retransmissions, is required. In the absence of careful scheduling and planning, this retransmission causes significant inefficiency, from the perspective of the entire network, due to redundancy and lack of knowledge of urgency of the data.

The present invention advantageously provides an efficient data structure that allows optimization of the total amount of data received by the whole system. The current invention uses knowledge about the state of the nodes, the importance of data units to be disseminated, as well as the wireless environment information, to optimize how data should be prioritized and scheduled. Specifically, the inventive system and method comprises identifying a data unit, assigning a class to the data unit, generally based on who needs that data most, identifying a connectivity type which can describe the topology of the nodes and the transmission rate among the nodes, computing a significance factor based on the connectivity type and the class, mapping the significance factor to a priority factor, and scheduling output of the data unit based on the priority factor. In one embodiment, the class is assigned based on which nodes possess copies of the data unit at a given time. In one embodiment, computing a significance factor is done using an algorithm based on how many nodes will receive data, and the importance to a particular node to obtain the data.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION

The present invention advantageously provides a system and method for optimizing the efficiency of data sharing among a set of radio nodes in a harsh radio environment. The solution enables the efficient dissemination of data that was not successfully received by all nodes during a first broadcast of the data. The system and method consider the dynamic situation including the data received status of each node and the connectivity of all the nodes, and assign priority to each data unit so that the overall performance is optimized.

A harsh radio environment in which connectivity is intermittent, such as the Adaptive Cognition Enhanced Radio Teams (ACERT) environment, provides an example of the environment where the present invention can be applied. Four radio nodes moving around will try to send data to all the radio nodes or team members. The goal is for each node to send all the locally generated data to all the team members in the shortest time. Likely scenarios for the ACERT environment include those in which the amount of data awaiting to be disseminated and the amount of data that have been received can be significantly different for each node, depending on the connectivity of the nodes and the capacity of the channels. Optimization of data dissemination with respect to a broadcast (or multicast) environment is called "non-flat" broadcasting. The ACERT environment adds further complexity since the channel capacity is changing. This unevenness in data source, data sink, and channel capacity suggests that a prioritized data structure and mechanism can drastically improve overall performance. The present invention illustrates how the data should be organized, prioritized, and propagated to better match the characteristics of the dynamic channel and the multicast application, optimizing data dissemination.

Figure 1:
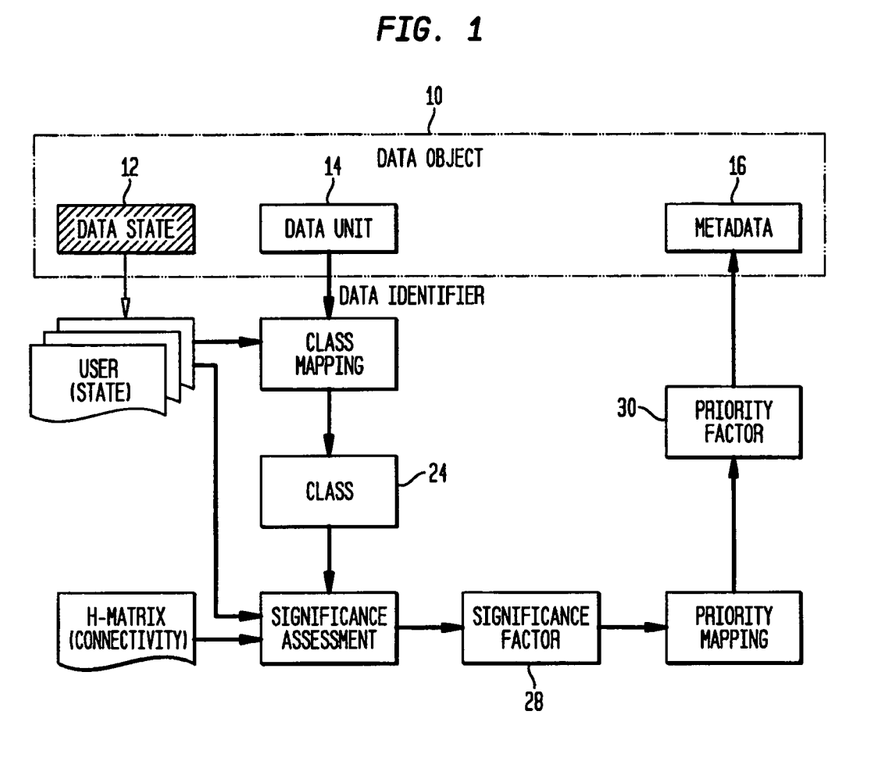
FIG. 1 is a schematic diagram of the prioritizing portion of the invention.
Figure 2:
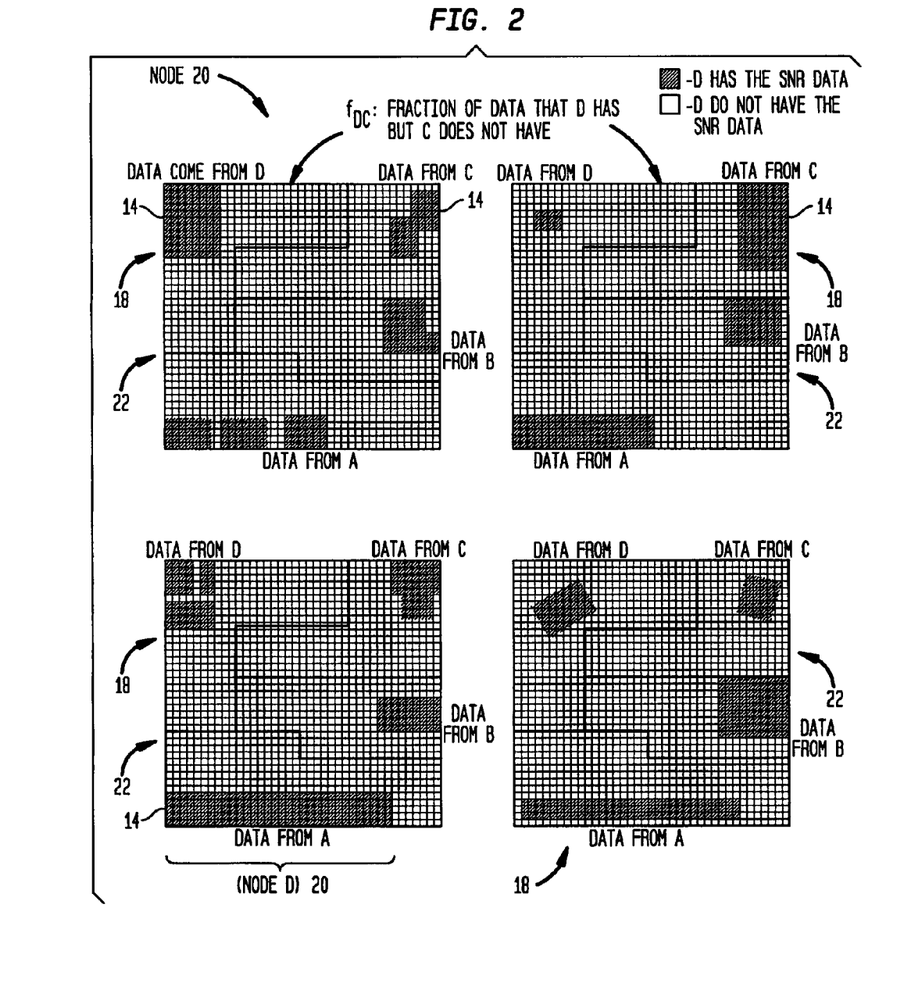
FIG. 2 is a snapshot of four application maps in a node.

FIG. 1 shows a schematic diagram for the computing of priority information in an embodiment of the invention, and FIG. 2 is a snapshot of four application maps in a node. Each data object 10 has 3 parts: data state 12, data unit 14, and metadata 16. Data state 12 is the property of the data that indicates whether the data unit 14 exists in the node 20, shown in FIG. 2. A user digest 22, shown in FIG. 2 and described in detail below, is created based on the data state 12. The data unit 14 carries the data type or content of the data such as the environment signal to noise ratio (SNR) measurement, radio link SNR, time, and location information, such as location determined via global positioning satellite (GPS), or other data. Metadata 16 is the priority data and may carry other information such as instructions for how the data object is handled.

The ACERT application multicasts data of different data types. Different types of data may be placed in separate packets (packetized separately) or bundled together. These data packets are ACERT data units 14. The total data is known as the application data map or application map 18, shown in FIG. 2. A data unit 14 may represent any of the above data types. This is called an application data map 18 since when a piece of data unit 14 is generated, it is usually associated with a grid location, such as a SNR measurement, or a piece of time and position data. In general, a data unit 14 does not need to be associated with a particular location. Instead, for example, a data unit 14 can be associated with time, or just associated with a sequence number.

As discussed above, FIG. 2 shows a snapshot of four application maps 18 in node D 20, in which the shaded cells or little squares represent data units 14 of either locally generated data or received data. This snapshot can be used to measure the benefit to the ACERT system with respect to broadcasting a piece of data unit 14. The application map 18 of each node 20 can be represented as a user-level digest, or user digest 22, that is, a table with entries of a's and 1's for a node 20. A 0 indicates the absence of a particular data unit 14 while a 1 indicates its presence. The user digest 22 is broadcast to all the other nodes 20 regularly, e.g. once every ten seconds. The optimum value of frequency of user digest broadcast is a systems parameter and will depend on the overall resource of the system. At each node 20, all of the user digests 22 from all of the nodes are compared to create an entity called Significance Weighting Factor (SWF), $w_y$, defined as follows:

$w_y$—A measure of the importance of a data unit that node y does not have, given by, $$w_y = b + (1 - f_y) \qquad (3.1)$$

where b is a fixed bias of 0.5.

$f_y$=fraction of y's received data divided by the total acquired data (excluding data generated by y). As an example, the fraction of received data by node C, $f_C$ is given by:

$$f_c = \frac{d + a + b}{D + A + B} \qquad (3.2)$$

where upper case letters represent the generated data, and lower case letters represent the received data. With this definition, $f_y$ ranges from 0 to 1 and the corresponding $w_y$ ranges from 1.5 to 0.5.

As discussed above, a characteristic of the ACERT environment is that the demand or significance of a unit of data varies according to data types such as time, situation, radio conditions, and the aggregate status of all of the data delivery throughout the ACERT run. To best fit this demand structure, an inventive prioritized data structure called Demand-Driven Priority Data Structure (DDPDS) is provided. This structure is based on a classification of all the data units 14 at an ACERT node according to which set of nodes of the ACERT team possess that unit of data during a certain time interval. The class is called Data Delivery Class, or simply class 24. The total number of classes 24 is given by the combination of all the set of nodes 20 having that unit of data 14. Table 1 illustrates the basic structure of the class 24 for the 4-node ACERT scenario.

Organizing the data in the classes 24 of DDPDS explicitly differentiates the level of demand for each data unit 14. As an example, class 0010 24 refers to the data that only node 3 20 possesses. When node 3 20 broadcasts this data unit 14, if the broadcast is successful, three other nodes 20 will receive, and benefit from, the data, thereby increasing the total benefit count of the ACERT system by three units of data. As a comparison, for class 1011 24, nodes 1, 3, and 4 all have the data unit 14. If node 3 20 broadcasts this data unit 14, if the broadcast is successful, only node 2 20 will benefit from it, raising the total benefit count by one unit. Compared to the class 0010 24, sending data from class 1011 24 is expected to provide less value from the perspective of ACERT's overall goal.

TABLE 1

| | Data Delivery Class | | | |
|---|---|---|---|---|
| Class ($\delta_1\delta_2\delta_3\delta_4$) | Data possessed by node 1 | Data possessed by node 2 | Data possessed by node 3 | Data possessed by node 4 |
| 0000 | 0 | 0 | 0 | 0 |
| 0001 | 0 | 0 | 0 | 1 |
| 0010 | 0 | 0 | 1 | 0 |
| 0011 | 0 | 0 | 1 | 1 |
| 0100 | 0 | 1 | 0 | 0 |
| 0101 | 0 | 1 | 0 | 1 |
| 0110 | 0 | 1 | 1 | 0 |

TABLE 1-continued

Data Delivery Class

| Class ($\delta_1\delta_2\delta_3\delta_4$) | Data possessed by node 1 | Data possessed by node 2 | Data possessed by node 3 | Data possessed by node 4 |
|---|---|---|---|---|
| 0111 | 0 | 1 | 1 | 1 |
| 1000 | 1 | 0 | 0 | 0 |
| 1001 | 1 | 0 | 0 | 1 |
| 1010 | 1 | 0 | 1 | 0 |
| 1011 | 1 | 0 | 1 | 1 |
| 1100 | 1 | 1 | 0 | 0 |
| 1101 | 1 | 1 | 0 | 1 |
| 1110 | 1 | 1 | 1 | 0 |
| 1111 | 1 | 1 | 1 | 1 |

Figure 3:
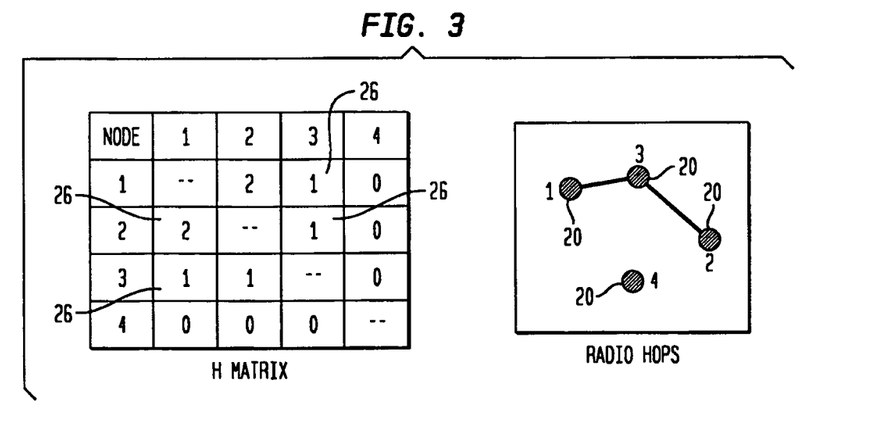
FIG. 3 illustrates a Connectivity Matrix and Radio Hops.

The benefit of broadcasting a particular data unit 14 will also depend on the current communications channels among the nodes 20. In general, connectivity among ACERT nodes 20 can be described by a matrix H, which is an n×n matrix where the i-jth element indicates the minimum number of radio hops between node i and node j. As illustrated in FIG. 3, if the radio power of node i and j can reach each other, they are 1-hop connected. If node 1 and 3 are 1-hop connected and node 3 and 2 are also 1-hop connected, but node 1 and 2 are not within each other's radio range, node 1 and 2 are 2-hop connected, with a corresponding entry of 2 in the H matrix (first row, second column). In general, node x and node y are n-hop connected if the shortest path between them contains n radio links.

Figure 4:
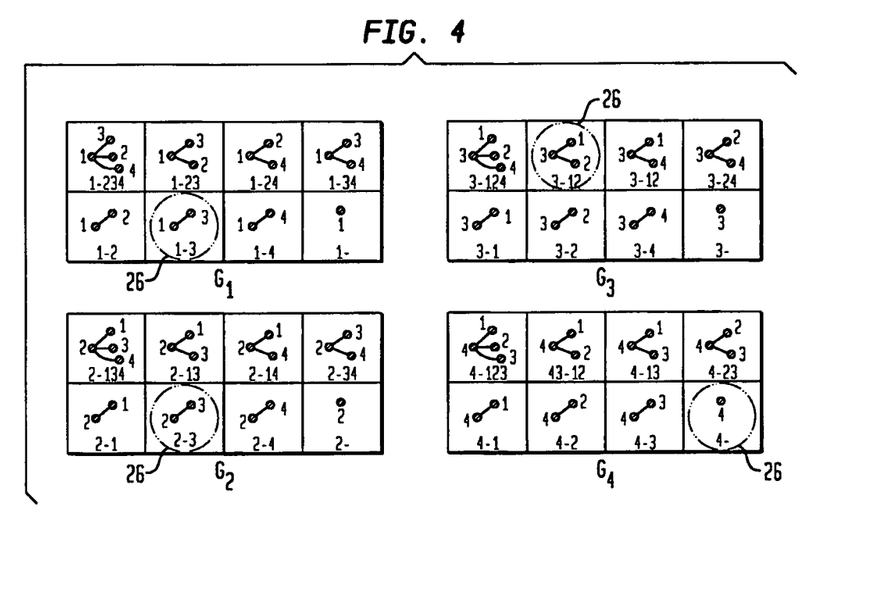
FIG. 4 illustrates Types of Neighborhood Groups.

To incorporate the connectivity type or state 26 in the context of DDPDS, the concept of a neighborhood group, $G_i$ is defined with respect to a broadcasting radio node 20. A group $G_i$ consists of the broadcasting node i and all the nodes that are 1-hop connected to i. The different types of neighboring groups with respect to different radio nodes 20 of FIG. 3 are shown in FIG. 4. As illustrated in FIG. 4, for each group, there are eight types of connectivity in the four-node ACERT environment. The circled connectivity type 26 of each group corresponds to the radio hop topology of FIG. 3.

The connectivity topology will impact the significance of the Delivery Data class 24 with respect to the overall ACERT goal, and will be described in more detail below.

The impact of connectivity on the benefit of broadcasting a particular class 24 of data is shown in Table 2, which has columns of the different group types, and rows of the classes 24, and can portray placing the classes 24 against the neighboring group types. In Table 2, numerical values are placed in the relevant entries of the table, each value or entry is total number of data units 14 received in the ACERT system if the particular class 24 of data unit 14 is broadcasted. This entry can be considered as a first level priority assignment, where a bigger number suggests higher priority.

Figure 5:
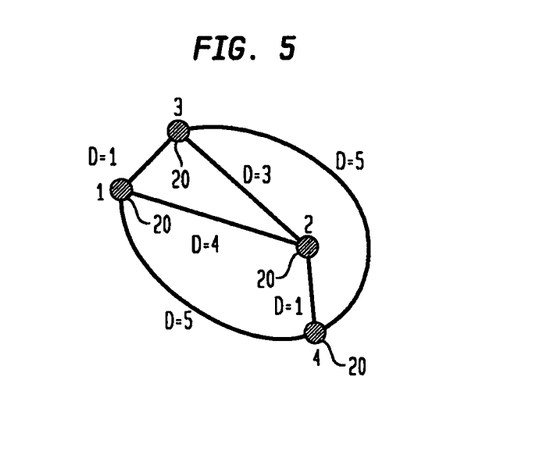
FIG. 5 illustrates a Distance Metric for Arbitration.

In Table 2, there are certain entries where a node ID, e.g.—(B), is entered. This indicates that instead of node A sending the data, it is suggested that the node inside the parenthesis (node B) will send the data. The reason for another node sending the data is that when there is more than one node possessing the data, only one node should send the data, to avoid duplication. Therefore, an arbitration process can be executed among the nodes 20 so that only one node 20 sends the data unit 14. The arbitration process depends on the proximity and channel conditions among the peers, with details of the algorithm presented below. In one embodiment, a distance metric as shown in FIG. 5 can provide the criteria for choosing a certain node in Table 2. In this embodiment, the shorter distance is selected.

TABLE 2

Priority Consideration

| Class ABCD | Node A's Neighborhood Group Types | | | | | | | |
|---|---|---|---|---|---|---|---|---|
| | A-BCD | A-BC | A-BD | A-CD | A-B | A-C | A-D | A- |
| 0000 | — | — | — | — | — | — | — | — |
| 0001 | — | — | — | — | — | — | — | — |
| 0010 | — | — | — | — | — | — | — | — |
| 0011 | — | — | — | — | — | — | — | — |
| 0100 | — | — | — | — | — | — | — | — |
| 0101 | — | — | — | — | — | — | — | — |
| 0110 | — | — | — | — | — | — | — | — |
| 0111 | — | — | — | — | — | — | — | — |
| 1000 | 3 | 2 | 2 | 2 | 1 | 1 | 1 | — |
| 1001 | 2 | 2 | 1 | 1 | 1 | 1 | — | — |
| 1010 | 2 | -(C) | 2 | -(C) | 1 | — | 1 | — |
| 1011 | -(D) | -(C) | 1 | — | 1 | — | — | — |
| 1100 | -(B) | 1 | -(B) | 2 | — | 1 | 1 | — |
| 1101 | 1 | 1 | — | 1 | — | 1 | — | — |
| 1110 | -(B) | — | -(B) | 1 | — | — | 1 | — |
| 1111 | — | — | — | — | — | — | — | — |

The effect of connectivity and arbitration on assigning values for the classes 24 of data in DDPDS has been explored. In addition, the effect of the SWF, that is, a measure of the significance of a piece of data with respect to two nodes, e.g. Eq. 3.1, can be included in DDPDS by replacing the entries of DDPDS Table 2 by a Significance Factor (SF) 28, according to the following formula:

$$SF \text{ for node } x: \sum_{y \neq x}(1-\delta_y)w_y p_{xy} \qquad (3.3)$$

where:

Class 24 is denoted as binary ($\delta_1\delta_2\delta_3\delta_4$), e.g. 0010 is class 2. $\delta_y$ is 0 if node y does not have the data, and 1 if node y has the data. Thus, class 2 (0010) indicates that node 3 has the data while nodes 1, 2, and 4 do not have the data;

$w_y$ is a measure of the importance of a data unit 14, which node x has, but node y does not have (see Eq. 3.1 above); and $p_{xy}$ is the probability of successful communications between node x and y.

With this formula, and assuming $p_{xy}$ is 1, we obtain DDPDS Table 3.

TABLE 3

DDPDS Table (1-hop nodes)

| Class ABCD | Node A's Neighborhood Group Types | | | | | | | |
|---|---|---|---|---|---|---|---|---|
| | A-BCD | A-BC | A-BD | A-CD | A-B | A-C | A-D | A- |
| 0000 | — | — | — | — | — | — | — | — |
| 0001 | — | — | — | — | — | — | — | — |
| 0010 | — | — | — | — | — | — | — | — |
| 0011 | — | — | — | — | — | — | — | — |
| 0100 | — | — | — | — | — | — | — | — |
| 0101 | — | — | — | — | — | — | — | — |
| 0110 | — | — | — | — | — | — | — | — |
| 0111 | — | — | — | — | — | — | — | — |
| 1000 | $w_2 + w_3 + w_4$ | $w_2 + w_3$ | $w_2 + w_4$ | $w_3 + w_4$ | $w_2$ | $w_3$ | $w_4$ | — |
| 1001 | $w_2 + w_3$ | $w_2 + w_3$ | $w_2$ | $w_3$ | $w_2$ | $w_3$ | — | — |
| 1010 | $w_2 + w_4$ | -(C) | $w_2 + w_4$ | -(C) | $w_2$ | — | $w_4$ | — |
| 1011 | -(D) | -(C) | $w_2$ | — | $w_2$ | — | — | — |
| 1100 | -(B) | $w_3$ | -(B) | $w_3 + w_4$ | — | $w_3$ | $w_4$ | — |
| 1101 | $w_3$ | $w_3$ | — | $w_3$ | — | $w_3$ | — | — |
| 1110 | -(B) | — | -(B) | $w_4$ | — | — | $w_4$ | — |
| 1111 | — | — | — | — | — | — | — | — |

The SF 28 can then be mapped into Priority classes either via pre-defined mapping, or ranked based mapping.

Thus, how to assign significance to the classes 24 taking into account the connectivity topology is described. Nodes that are more than 1-hop away have not been considered, or a weight of zero is assumed to be assigned to the nodes that are 2-hop or more away. This is because the initial focus is on the direct data transfer path, and does not consider indirect transfer such as A→B→C. However, in some very harsh radio environments, certain nodes may not be in each other's range for a long time period. In such situations, it is desirable to take advantage of the indirect path.

Figure 6:
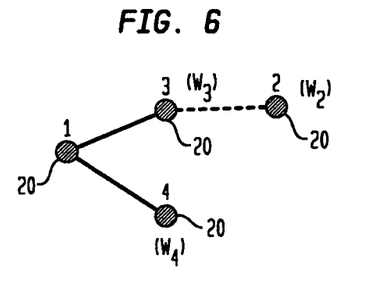
FIG. 6 illustrates Assignment of Weights to 2-hop Nodes.

To enable the indirect path, the SF 28 is augmented to include assigning weights to second hop nodes. This is illustrated in FIG. 6. In this scenario, node 1 20 is directly connected to node 3 20 and node 4 20, and is 2-hop connected to node 2 20 via node 3 20. When node 2 20 is data-hungry, that is, lacking much data, it can be worthwhile to send a data unit 14 to node 3 20 and request the data unit 14 be forwarded to node 2 20. This occurs when $w_2$ is large. To implement second hop nodes, node 1 20, for example, needs to mark the data so that node 3 20 can immediately send the data unit 14 to node 2 20 with the highest priority. The new SF 28 for 2-hop networks is given by:

$$SF \text{ for node } x(\text{2-hop}): \sum_{y \ne x} \left[ (1 - \delta_y) \left( w_y p_{xy} + \sum_{\substack{z \ne x \\ z \ne y}} t_2 w_z p_{yz} \right) \right] \quad (3.4)$$

Where $t_2$ is a coefficient assigned for 2-hop nodes and defined as $\alpha(I-\delta y)$. The initial value of $\alpha$ can be assigned between 0.5-1. Details of $\alpha$ are not addressed herein.

An example of comparing 1-hop and 2-hop priority assignment for the topology of FIG. 6 is as follows (assume $w_2 = w_3 > w_4$, $\alpha$ is 0.5 and $w_4 > 0.5 w_2$). In Table 4, mapping of the SF 28 into priority factor 30 is based on a straight ranking arrangement to illustrate the impact of 2-hop connections.

TABLE 4

Comparison of 1-hop and 2-hop priority assignment

| Class 1234 | 1-hop 1-34 | 2-hop 1-3 . . . 2 1-4 | 1-hop Priority | 2-hop Priority |
|---|---|---|---|---|
| 1000 | $w_3 + w_4$ | $w_3 + 0.5 w_2 + w_4$ | 1 | 1 |
| 1001 | $w_3$ | $w_3 + 0.5 w_2$ | 2 | 3 |
| 1010 | -(C) | -(C) | — | — |
| 1011 | — | — | — | — |
| 1100 | $w_3 + w_4$ | $w_3 + w_4$ | 1 | 2 |
| 1101 | $w_3$ | $w_3$ | 2 | 4 |
| 1110 | $w_4$ | $w_4$ | 3 | 5 |
| 1111 | — | — | — | — |

The priority computation operates as follows. A data unit 14 is created and assigned a unique identifier, such as a file name. User digest 22 is obtained periodically, which is used to assign class mapping to the data unit 14 according to Table 1. The H-matrix identifies the connectivity type 26, which corresponds to the column of Table 3, which is used to compute the SF 28 using Eq. 3.4. SF 28 is then mapped to a priority factor 30, e.g. 1 to q, according to some predefined mapping or a straight ranking arrangement.

Figure 7:
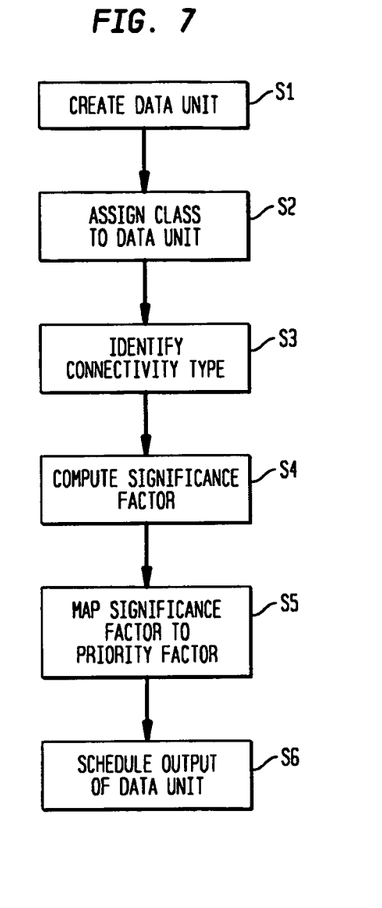
FIG. 7 is a flow chart of an embodiment of the invention.

FIG. 7 is a flow chart of an embodiment of the invention in accordance with FIGS. 1 and 2. A data unit 14 is created at a node 20 and assigned a unique identifier, such as a file name, in step S1. A class 24 is assigned to the data unit 14 in step 2, based on an application map 18. In step S3, the connectivity type 26 is identified in accordance with an H-matrix, described above, which corresponds to the column of Table 3 or Table 4. Based on the connectivity type 26 and the class 24, the SF 28 is computed in step S4. SF 28 is then mapped to a priority factor 30 in step S5, according to some predefined mapping or a straight ranking arrangement. Once the priority mapping is created, a scheduler (not shown) is used to schedule the output of the data unit in the FIFO buffer in step S6. Scheduler algorithms such as priority queuing, and/or weighted priority queue, may be used.

Arbitration Process

When more than one node 20 has the same class 24 of data, it is desirable to have an arbitration process so that only one node 20 sends the data or data unit 14. This section provides an algorithm that can be used for this arbitration. Note that the arbitration process is run independently on each node 20 based on the node's local view of network connectivity. The nodes share data about the communication environment continuously, but for arbitration, they do not have explicit communication; they just use the information that they have already collected. The arbitration algorithm is as follows.

1. If two or more nodes 20 have data unit 14, compare the number of nodes that are 1-hop connected from these nodes. The node with the larger number of 1-hop connected nodes wins. This rule can be extended to n hops.

2. If rule 1 does not resolve—that is the nodes have the same number of 1—hop connected nodes (or up to n-hop)—compute the total of the distance of all the 1-hop connected nodes; the one with shorter distance wins.

3. If rule 2 does not resolve, use the order of node ID so that the smallest or lowest ID wins.

It should be noted that these rules should resolve most of cases. However, in certain scenarios, the rule may become undetermined. The problem is that one node may decide one way, while the other may arrive at a different conclusion, potentially due to synchronization of data or error conditions. However, these cases are rare, and even if it happens, the performance penalty for a non-optimal decision is minor.

Example

The ACERT environment can be defined within a grid of 100 m by 100 m, which is divided into 1 $m^2$ "cells". In this ACERT example, four ACERT nodes will be moving in designated paths at a pace of ~1.4 m/s for a thirty minute period called a run. During this period, each node will traverse about 25% of the grid, performing a number of measurements including locating itself, measuring an environmental SNR value called SNR map, and estimating the capability to communicate to all the other nodes of the team. All the measurement data need to be disseminated to all the other nodes of the team within the run. At the end of the run, the measured data will be evaluated on its integrity against some predefined metrics. After the first run, communication radio link performance information can be kept, all other measurements including the SNR map, are to be discarded. A second run of another thirty minutes will be performed. The purpose of the second run is to test how well the cognitive algorithm performs. The same set of parameters will be measured in the second run, except that the metrics are more stringent.

A fundamental characteristic of the ACERT application is that data need to be disseminated from each node to all the other nodes during the thirty minute run. Since the evaluation metric evaluates the amount of data disseminated to all the nodes during the run, there is no delay requirement on each message or packet during the communications among ACERT nodes. Each node will be generating new data as it traverses the grid.

The implementation of ACERT is called Cognitive Adaptive Radio Team (CART). The CART physical environment is characterized by the following properties:

An inherent wireless broadcast medium. Unicast and multicast are supported in the same shared medium. Initial implementation is based on 802.11b, therefore, unicast packets are acknowledged while broadcast packets are unacknowledged.

Precise location of each node is acquired via GPS and an anchored node system. Location information is distributed among ACERT nodes.

Each node is capable of learning about its surrounding radio environment via an application called Radio Environment Modeling Application or REMA, which provides the best estimate and a prediction of the communication capability among all the ACERT nodes. Each node is also capable of learning about its own trajectory and speed, as well as those of its peers. The information constitutes a knowledge base and is used to devise a cognitive plan recommending what data to send and how it should be sent.

Routing is treated as inherent in the data dissemination mechanism in phase 1, because of the special multicast application. Hence, an ad-hoc routing algorithm is not used. Future phases may incorporate ad-hoc routing when other applications, such as those with real-time requirements, are included.

A demonstration of the quantitative advantage of using the DDPDS follows. This example focuses on the data storage and transmission at one of the ACERT nodes, that is, node A. At node A, the classes 1000, 1001, . . . 1110, classes 8 to 14 of Table 1 above, can be modeled as FIFO buffers. In the ACERT environment, due to the uncertainty of the connectivity and the resulting channel rates, the FIFO buffers at each node are each expected to have data waiting to be sent out.

For our heuristic computation, assume that all the channel rates are four units per time interval. The following two strategies are compared:

Strategy I:

In this approach, which can be viewed as closely related to the epidemic algorithms and the related Gossip approach discussed above, each node randomly picks another node, for example, node A picks node C. Node A determines the part of its missing data that node C has, and initiates a session between node A and node C to acquire the missing pieces. Although in the Gossip approach the exchange of missing data is unicast between node A and node C, the model can be extended and can allow other nodes to eavesdrop on the data. For example, consider that node B gossips with node A via 802.11 broadcast. Since node B finds out the missing data that node A has, node B pulls the missing data from node A. The data that node A sends to node B can be considered as the data corresponding to classes 1000, 1001, 1010, and 1011. Note that this approach does not explicitly employ classes, but they are used here for comparison with Strategy II below. The classes selected by node C and node D, when they simultaneously gossip with node B, are shown in FIG. 8.

Figure 8:
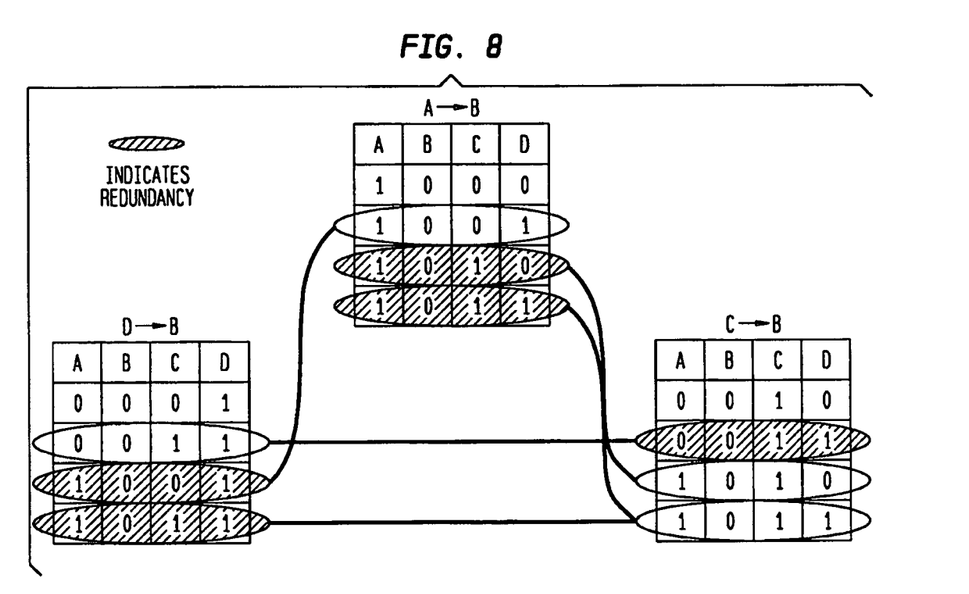
FIG. 8 is a benefit count in strategy I.

Because each node (A, C, D) only worries about sending B's missing data, some of the broadcast data from these nodes overlap, as identified by the shaded circles in FIG. 8. Taking this redundancy into account, the total benefit count can be computed by counting the number of zeros in all the classes in FIG. 8, and subtracting the number of zeros inside the shaded circles, since they are redundant. The total benefit count is sixteen units.

Strategy II (DDPDS):

In this approach, each node knows the user digest of all the other nodes and organizes the data according to the data delivery classes. For comparison, we also compute the benefit when each of the nodes A, C, and D sends four units of data out. The difference from Strategy I is that each node does not just send data to a particular node, and that the classes are selected to maximize the increase in overall benefit. The DDPDS will also use an arbitration mechanism to ensure data redundancy is minimized.

Figure 9:
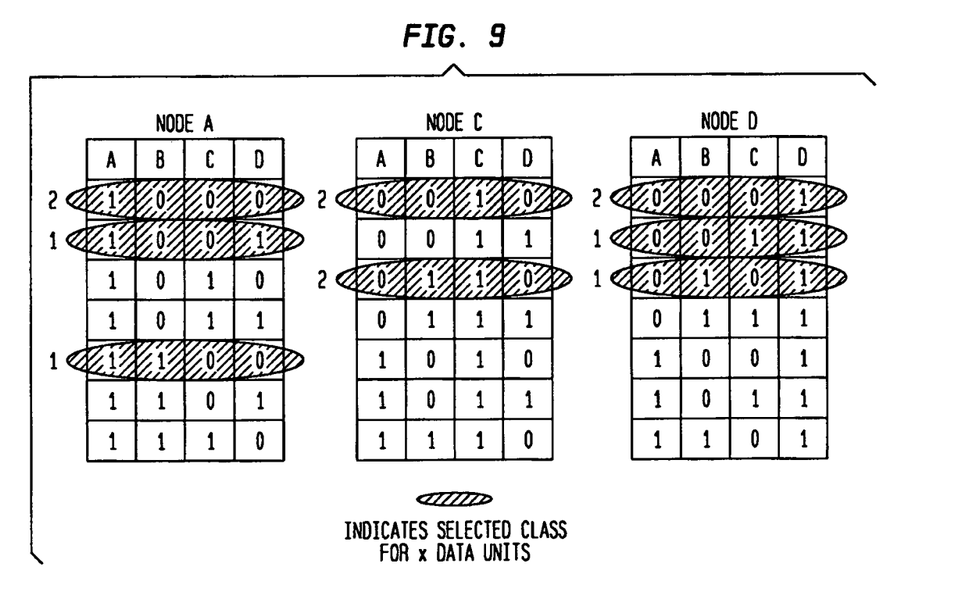
FIG. 9 is a benefit count in strategy II.

Assuming that the classes are selected as shown in FIG. 9, the total units of benefit can be computed by counting the weighted sum of the number of zeros in the selected, shaded classes, the weight being the number of data units selected for that particular class, which comes out to be thirty units. This is over fifty percent better than Strategy I.

As discussed above, in the phase 1 ACERT environment, each node is moving at a rate of about 1.4 m/s. The 802.11 radio link used for phase 1 has a range of several tens of meters. For the 100 m×100 m grid, the connectivity topology is expected to change in the order of seconds or tens of seconds. This is an important systems parameter, which is directly related to the systems requirement for the rate of priority update.

While the present invention has been described in particular embodiments, it should be appreciated that the present invention should not be construed as limited by such embodiments, but rather construed according to the below claims.

The invention claimed is:

1. A method for optimizing efficiency of data sharing among a plurality of radio nodes in a radio environment, the method comprising:
    mapping one or more data units stored in a first node to a first digest, wherein the plurality of radio nodes comprise the first node and one or more second nodes;
    broadcasting the first digest to at least one node of the one or more second nodes;
    comparing the first digest to at least one second digest from at least one node of the one or more second nodes to determine significance weighting factors for the one or more data units; and
    broadcasting at least one of the one or more data units to at least one of the one or more second nodes according to a schedule of significance factors based at least in part upon the significance weighting factors and connectivity among the plurality of radio nodes, the connectivity comprising at least one of proximity of radio nodes to others of the plurality of radio nodes or channel conditions among the plurality of radio nodes, wherein the schedule effects broadcasting at higher priorities the at least one of the one or more data units to radio nodes having a greater number of radio nodes connected thereto within a predetermined number of radio hops.

2. The method of claim 1 wherein mapping the one or more data units stored in the first node to the first digest comprises mapping the one or more data units stored in the first node to a first data map where the one or more data units are arranged according to at least one of a grid location, a time unit, or position data.

3. The method of claim 1 wherein comparing the first digest to the at least one second digest comprises comparing the first digest to the at least one second digest based at least in part on particular data units stored at individual ones of the plurality of radio nodes.

4. The method of claim 1 further comprising scheduling broadcasting of the at least one of the one or more data units using a scheduler algorithm.

5. The method of claim 1 further comprising mapping the significance weighting factors for respective data units of the one or more data units to a priority factor.

6. The method of claim 5 wherein the mapping the significance weighting factors for the respective data units of the one or more data units to the priority factor further comprises performing an arbitration process to determine the priority factor.

7. The method of claim 1 further comprising identifying a connectivity type between the first node and at least one node of the one or more second nodes, wherein the connectivity type comprises at least one of a topology of the plurality of radio nodes or a transmission rate among the plurality of radio nodes.

8. A non-transitory computer readable medium having instructions stored thereon, the instructions configured to cause a device to perform operations comprising:
mapping one or more data units stored in a first node to a first digest, wherein the plurality of radio nodes comprise the first node and one or more second nodes;
broadcasting the first digest to at least one node of the one or more second nodes;
comparing the first digest to at least one second digest from at least one node of the one or more second nodes to determine significance weighting factors for the one or more data units; and
broadcasting at least one of the one or more data units to at least one of the one or more second nodes according to a schedule of significance factors based at least in part upon the significance weighting factors and connectivity among the plurality of radio nodes, the connectivity comprising at least one of proximity of radio nodes to others of the plurality of radio nodes or channel conditions among the plurality of radio nodes, wherein the schedule effects broadcasting at higher priorities the at least one of the one or more data units to radio nodes having a greater number of radio nodes connected thereto within a predetermined number of radio hops.

9. The non-transitory computer readable medium of claim 8 wherein mapping the one or more data units stored in the first node to the first digest comprises mapping the one or more data units stored in the first node to a first data map where the one or more data units are arranged according to at least one of a grid location, a time unit, or position data.

10. The non-transitory computer readable medium of claim 8 wherein comparing the first digest to the at least one second digest comprises comparing the first digest to the at least one second digest based at least in part on particular data units stored at individual ones of the plurality of radio nodes.

11. The non-transitory computer readable medium of claim 8 wherein the operations further comprise scheduling broadcasting of the at least one of the one or more data units using a scheduler algorithm.

12. The non-transitory computer readable medium of claim 8 wherein the operations further comprise mapping the significance weighting factors for respective data units of the one or more data units to a priority factor.

13. The non-transitory computer readable medium of claim 12 wherein the mapping the significance weighting factors for the respective data units of the one or more data units to the priority factor further comprises performing an arbitration process to determine the priority factor.

14. The non-transitory computer readable medium of claim 8 wherein the operations further comprise identifying a connectivity type between the first node and at least one node of the one or more second nodes, wherein the connectivity type comprises at least one of a topology of the plurality of radio nodes or a transmission rate among the plurality of radio nodes.

15. A radio node comprising:
a memory;
a communication device;
a processing device, in communication with the memory and the communication device, configured to:
map one or more data units stored in the memory to a local digest;
broadcast the local digest using the communication device to at least one node in a plurality of radio nodes, the plurality of radio nodes comprising the radio node and one or more second radio nodes;
receive a remote digest from at least one node of the one or more second radio nodes using the communication device;
compare the remote digest and the local digest to determine significance weighting factors for the one or more data units; and
broadcast at least one of the one or more data units using the communication device to at least one node of the second radio nodes according to a schedule of significance factors based at least in part upon the significance weighting factors and connectivity among the plurality of radio nodes, the connectivity comprising at least one of proximity of radio nodes to others of the plurality of radio nodes and channel conditions among the plurality of radio nodes, wherein the schedule effects broadcasting at higher priorities the at least one of the one or more data units to radio nodes having a greater number of radio nodes connected thereto within a predetermined number of radio hops.

16. The radio node of claim 15 wherein the local digest comprises a data map where the one or more data units are arranged according to at least one of a grid location, a time unit, or position data.

17. The radio node of claim 15 wherein the significance weighting factors are based at least in part on particular data units stored at individual ones of the plurality of radio nodes.

18. The radio node of claim 15 wherein the processing device is configured to determine the schedule of significance factors according to a scheduler algorithm.

19. The radio node of claim 15 wherein the one or more data units comprises a locally measured data type.

20. The radio node of claim 19 wherein the locally measured data type comprises at least one of SNR from a specific radio source, radio link SNR between nodes, or GPS location at a given time.

* * * * *